(12) United States Patent
Kashiwada et al.

(10) Patent No.: US 7,938,941 B2
(45) Date of Patent: May 10, 2011

(54) CATION-EXCHANGE FLUORINATED MEMBRANE FOR ELECTROLYSIS AND PROCESS FOR PRODUCING THE SAME

(75) Inventors: Akio Kashiwada, Tokyo (JP); Toshinori Hirano, Tokyo (JP); Hiroshi Nakayama, Tokyo (JP)

(73) Assignee: Asahi Kasei Chemicals Corporation, Tokyo (JP)

( * ) Notice: Subject to any disclaimer, the term of this patent is extended or adjusted under 35 U.S.C. 154(b) by 585 days.

(21) Appl. No.: 11/990,390

(22) PCT Filed: Jan. 5, 2006

(86) PCT No.: PCT/JP2006/300033
§ 371 (c)(1),
(2), (4) Date: Feb. 13, 2008

(87) PCT Pub. No.: WO2007/032098
PCT Pub. Date: Mar. 22, 2007

(65) Prior Publication Data
US 2009/0120788 A1    May 14, 2009

(30) Foreign Application Priority Data
Sep. 14, 2005  (JP) .................. 2005-267316

(51) Int. Cl.
*C25B 13/02* (2006.01)
(52) U.S. Cl. .......................... 204/296; 521/27
(58) Field of Classification Search .................. 204/296; 429/483, 491, 492, 493, 494, 529, 534; 521/27
See application file for complete search history.

(56) References Cited

U.S. PATENT DOCUMENTS

| | | | |
|---|---|---|---|
| 4,349,422 A | 9/1982 | Maloney | |
| 4,964,960 A | 10/1990 | Keating et al. | |
| 5,169,983 A | 12/1992 | Fielding et al. | |
| 5,264,100 A | 11/1993 | Shimohira et al. | |
| 2003/0056805 A1 | 3/2003 | Sumita | |
| 2004/0099527 A1 | 5/2004 | Nakayama | |

FOREIGN PATENT DOCUMENTS

| | | |
|---|---|---|
| EP | 0 305 155 A2 | 3/1989 |
| JP | 56-152984 A | 11/1981 |
| JP | 57-131377 | 8/1982 |
| JP | 58-113225 A | 7/1983 |
| JP | 59-157293 A | 9/1984 |
| JP | 60-39184 A | 2/1985 |
| JP | 63-8425 A | 1/1988 |
| JP | 63-113029 A | 5/1988 |
| JP | 64-055393 A | 3/1989 |
| JP | 2-279732 A | 11/1990 |
| JP | 2-301583 A | 12/1990 |
| JP | 2-301584 A | 12/1990 |
| JP | 3-217427 A | 9/1991 |
| JP | 4-308096 A | 10/1992 |
| JP | 6-279600 A | 10/1994 |
| JP | 08-197060 A | 8/1996 |
| SU | 1541311 A1 | 2/1990 |
| TW | 157915 | 5/1991 |
| TW | 239867 | 2/1995 |
| TW | 591062 | 6/2004 |
| TW | 593461 | 6/2004 |

OTHER PUBLICATIONS

European Search Report issued Jul. 2, 2009 in corresponding European Patent Application No. EP 06 70 2128.
Decision of Grant in Russian application No. 2008114371 issued Oct. 27, 2009, and translation.

*Primary Examiner* — Bruce F Bell
(74) *Attorney, Agent, or Firm* — Birch, Stewart, Kolasch & Birch, LLP

(57) ABSTRACT

A cation-exchange membrane for electrolysis which comprises a fluoropolymer having ion-exchange groups and a porous base. It is characterized by having, on the anode-side surface of the membrane, protrusions comprising a polymer having ion-exchange groups. It is further characterized in that: when the average value of the heights of the tops of the protrusions from the anode-side surface of the membrane is expressed as h (μm), then $20 \leq h \leq 150$; when the density of the protrusions distributed is expressed as P (protrusions per $cm^2$), then $50 \leq P \leq 1,200$; when the average proportion of the areas of those bottom parts of the protrusions which are on the same level as the anode-side surface of the membrane to the area of the anode-side surface of the membrane is expressed as S ($cm^2/cm^2$), then $0.001 \leq S \leq 0.6$; and when the average proportion of the areas of the top parts of the protrusions to the area of the anode-side surface of the membrane is expressed as T ($cm^2/cm^2$), then $T \leq 0.05$.

7 Claims, No Drawings

CATION-EXCHANGE FLUORINATED MEMBRANE FOR ELECTROLYSIS AND PROCESS FOR PRODUCING THE SAME

TECHNICAL FIELD

The present invention relates to a cation-exchange membrane for electrolysis, and more specifically to a cation-exchange membrane for electrolysis, which is used for electrolyzing an aqueous solution of an alkali chloride, shows a stable electrolysis performance while maintaining electrochemical properties and mechanical strength, and can improve quality by reducing impurities especially in an alkali hydroxide produced through an ion exchange, and relates to a process for producing the same.

BACKGROUND ART

Since a fluorine-containing ion-exchange membrane has a superior heat resistance and chemical resistance, it is employed in various applications such as an ion-exchange membrane for electrolysis used in producing chlorine and an alkali hydroxide by electrolyzing an alkali chloride, and a barrier membrane for electrolysis including ozone generation, a fuel cell, water electrolysis and hydrochloric acid electrolysis, and its new usage is further expanding.

Among these applications, the ion-exchange membrane method has recently been the most popular process for producing chlorine and an alkali hydroxide by electrolyzing an alkali chloride. The ion-exchange membrane used here is required not only to have a high current efficiency, low electrolysis voltage, and an adequate membrane strength to prevent damages during handling or electrolysis, but also to reduce the concentration of impurities, especially alkali chlorides contained in an alkali hydroxide to be produced. In order to satisfy such requirements, various proposals have been made. It is widely known that the mainstream today is a fluorine-containing ion-exchange membrane having a multi-layered structure which includes a layer containing a fluorine-containing resin having a carboxylic acid group with a high electric resistance but a high current efficiency, and a layer containing a fluorine-containing resin having a sulfonic acid group with a low electric resistance, because of being useful.

In addition, although various proposals have been made to lower electric resistance by increasing the water content of a membrane, lowering electric resistance by increasing the ion-exchange capacity of a layer containing a carboxylic acid group causes a problem that current efficiency is lowered, and at the same time, impurities in an alkali hydroxide increase. Lowering electric resistance by increasing the ion-exchange capacity of the layer containing a sulfonic acid group causes a problem that the impurities in an alkali hydroxide to be produced increases, and besides, that the strength of the membrane remarkably decreases.

Recently, as Patent Documents 1 and 2 disclose, a reduction in electrolysis voltage and improvement of membrane strength are attempted by increasing the number of layers in the membrane and specifying the water content of each layer. However, in that case, if the water content of the layer facing to the anode side is too high, not only the strength of the membrane decreases, but also the concentration of impurities contained in alkali hydroxide to be produced increases.

On the other hand, as Patent Document 3 discloses, for instance, a method is also widely known which improves the strength of the membrane by embedding a porous substrate formed of a woven fabric made from a fluorine-containing polymer such as polytetrafluoroethylene (PTFE) into the membrane.

Furthermore, a method as in Patent Document 4 has been disclosed, which improves the strength of the membrane by projecting the shape of the woven fabric made from PTFE or the like toward the anode side. However, the method forms a section surrounded by the projecting parts of the woven fabric pattern, which reduces an amount of an aqueous solution of an alkali chloride to be supplied into the anode surface of the membrane, though depending on the electrolysis condition or the structure of an electrolysis cell, and increases an amount of impurities in an alkali hydroxide to be produced. For this reason, the quality of the alkali hydroxide cannot be stabilized.

Several methods for improving the shape of the surface of a membrane in an anode side are disclosed so as to reduce the amount of oxygen in chlorine produced in the anode side during electrolysis. Patent Document 5 discloses a method of forming a groove by transferring the shape of the press roll having protruding parts to the membrane, and Patent Document 6 discloses a method of forming a groove by embedding a woven fabric into the surface of the membrane and peeling it off. However, the ion-exchange membranes obtained by these production methods has to make the thickness of the resin on the porous substrate substantially thinner, because the porous substrate made from PTFE or the like preliminarily embedded in the membrane is pushed up to the reverse side of the surface of the membrane having the groove formed thereon, which leads to the lowering of the strength of the membrane. An ion-exchange membrane receives stresses from all directions during electrolysis, so that the ion-exchange membranes obtained by those production methods show significantly reduced strength against the stress in the direction different from the direction of the porous substrate made from the PTFE or the like, for instance, the stress in 45-degree direction to the porous substrate, and consequently cannot provide a stable electrolysis performance over a long period of time. Furthermore, the ion-exchange membranes obtained by those methods do not sufficiently improve the capacity of supplying the aqueous solution of the alkali chloride into a space between an anode and the surface of the membrane, and accordingly cannot reduce the amount of impurities in the alkali hydroxide to be produced.

Patent Document 1: JP-A-63-113029
Patent Document 2: JP-A-63-8425
Patent Document 3: JP-A-03-217427
Patent Document 4: JP-A-04-308096
Patent Document 5: JP-A-60-39184
Patent Document 6: JP-A-06-279600

DISCLOSURE OF THE INVENTION

Problem to be Solved by the Invention

If an alkali hydroxide contains a large amount of impurities, especially an alkali chloride, the alkali hydroxide is not suitable for applications such as a production process for rayon, pulp, paper and a chemical agent, in which a highly-pure alkali hydroxide product is required. Accordingly, such a cation-exchange membrane for electrolysis has been desperately desired as to be able to reduce the concentration of impurities in the alkali hydroxide to be produced.

The present invention relates to an ion-exchange membrane for electrolysis, which is used for electrolyzing an aqueous solution of an alkali chloride, shows a stable electrolysis performance while maintaining the electrochemical properties and mechanical strength over a long period of time, can improve the quality by reducing impurities especially in an alkali hydroxide produced through an ion exchange, and consequently has a level that has not been realized by a conventional technology, and relates to the process for producing the same.

Means for Solving the Problem

The present inventors made an extensive investigation to solve the above problems, as a result, found that impurities in an alkali hydroxide to be produced are generated when an anion enters a membrane from an anode side, is coupled with a cation and dissolves in a catholyte as an impurity, and that the phenomenon becomes apparent when the supply of the aqueous solution of an alkali chloride is insufficient on the surface in the anode side of the membrane, and accomplished the present invention.

In more detail, the present inventors analyzed ion-exchange membranes used in electrolysis cells made by various manufactures and in various operating conditions, and as a result, found the fact that when an anode closely contacting an ion-exchange membrane has a large area, when a current density of electrolysis is high, or when an aqueous solution is electrolyzed in a zero-gap electrolysis cell which brings the cathode of the electrolysis cell in contact with the surface of the ion-exchange membrane in the cathode side, fine foams are formed in the ion-exchange membrane along the shape of the anode of the electrolysis cell. As a result of evaluation of the performance, the present inventors discovered the fact that the amount of impurities in the alkali hydroxide increases in that part.

The reason why the fine foams are formed in the ion-exchange membrane was considered as follows: an aqueous solution of an alkali chloride is not sufficiently supplied to an anode chamber in the part where the anode of the electrolysis cell closely contacts the surface in the anode side of the ion-exchange membrane, and the concentration of the aqueous solution of the alkali chloride is lowered. Then, in order to solve the problem, the present inventors studied various shapes of the surface in the anode side of the ion-exchange membrane and achieved the present invention.

Accordingly, the aspects of the present invention are as described below.

1. A cation-exchange membrane for electrolysis comprising a fluorine-containing polymer having an ion-exchange group and a porous substrate, characterized in that the membrane has projecting parts comprising a polymer having an ion-exchange group on the surface of an anode side of the membrane;

$20 \leq h \leq 150$, where h is defined as an average value of heights (µm) from the surface of the anode side of the membrane to the tops of the projecting parts;

$50 \leq P \leq 1,200$, where P is defined as a distribution density (piece/cm$^2$) of the projecting parts;

$0.001 \leq S \leq 0.6$, where S is defined as an average value of area fractions (cm$^2$/cm$^2$) of the bottom faces of the projecting parts on the same plane as the surface of the anode side of the membrane; and $T \leq 0.05$, where T is defined as an average value of area fractions (cm$^2$/cm$^2$) of the top parts of the projecting parts on the surface of the anode side of the membrane.

2. The cation-exchange membrane according to the aspect 1, wherein $0.5 \leq b/a \leq 0.9$ and $0.25 \leq h/a \leq 0.80$, where a is defined as an average value of lengths (µm) of the bottom sides of the projecting parts on the same plane as the surface of the anode side of the membrane, and b is defined as an average value of widths (µm) of the projecting parts at the half heights h/2 (µm) of the projecting parts.

3. The cation-exchange membrane according to any one of the aspects 1 and 2, wherein the projecting parts are discontinuous with each other.

4. The cation-exchange membrane according to any one of the aspects 1 to 3, wherein the projecting parts have a single shape or a mixed shape of two or more shapes selected from the group consisting of a circular cone-like shape, a quadrangular pyramid-like shape, a circular truncated cone-like shape and a truncated quadrangular pyramid-like shape.

5. A process for producing an ion-exchange membrane for electrolysis, characterized by bringing an embossed release paper closely in contact with the surface of the anode side of the membrane and transferring the embossed shape of the release paper to the surface, when stacking a fluorine-containing polymer having an ion-exchange group is layered on a porous substrate, thereby forming a projecting part comprising a polymer having an ion-exchange group on the surface of an anode side.

6. The process according to the aspect 5, wherein the release paper is closely brought in contact with the surface of the anode side of the membrane by reducing pressure through the release paper.

7. The process according to the aspect 5, wherein the embossed shape is one shape or a mixed shape of two or more shapes selected from the group consisting of a circular cone-like shape, a multi-angular pyramid-like shape, a hemisphere-like shape, a dome-like shape, a circular truncated cone-like shape and a truncated multi-angular pyramid-like shape.

8. An electrolysis apparatus comprising the cation-exchange membrane according to any one of the aspects 1 to 4, a cathode and an anode, said apparatus being an electrolysis tank, wherein the surface having the projecting part of the cation-exchange membrane contacts or faces to the anode.

Advantages of the Invention

A fluorine-containing cation-exchange membrane according to the present invention can reduce impurities in an alkali hydroxide to be produced, while maintaining electrochemical properties and mechanical strength in electrolysis of an aqueous solution of an alkali chloride, and enables a high-quality alkali hydroxide to be produced over a long period of time.

BEST MODE FOR CARRYING OUT THE INVENTION

The details of the present invention will now be described below especially with reference to a preferred embodiment.

The present invention provides a cation-exchange membrane for electrolysis comprising a fluorine-containing polymer having an ion-exchange group and a porous substrate, characterized in that the membrane has projecting parts comprising a polymer having the ion-exchange group on the surface of an anode side of the membrane; $20 \leq h \leq 150$, where h is defined as an average value of heights (µm) from the surface of the anode side of the membrane to the tops of the projecting parts; $50 \leq P \leq 1,200$, where P is defined as a distribution density (piece/cm$^2$) of the projecting parts; $0.001 \leq S \leq 0.6$, where S is defined as an average value of area fraction (cm$^2$/cm$^2$) of the bottom faces of the projecting parts on the same plane as the surface of the anode side of the membrane; and $T \leq 0.05$, where T is defined as the average value of area fraction ($cm^2/cm^2$) of the top parts of the projecting parts on the surface of the anode side of the membrane.

Here, the surface of the anode side means the membrane surface which faces to the anode when the cation-exchange membrane for electrolysis according to the present invention is placed in an electrolysis cell. In the present invention, the surface of the anode side has projecting parts comprising a polymer having an ion-exchange group. In addition, in the present invention, the membrane surface including the projecting parts is referred to as "surface of anode side" for convenience sake, even when the membrane independently exists by itself without being embedded in the electrolysis cell.

As described above, in the present invention, projecting parts comprising a polymer having an ion-exchange group existing on the surface of the anode side of the membrane preferably has: a height of $20 \leq h \leq 150$ and more preferably $20 \leq h \leq 120$, where h represents an average value of heights (μm) from the surface of the anode side of the membrane to the tops of the projecting parts; a distribution density (piece/$cm^2$) of the projecting part on the surface of the anode side of the membrane of $20 \leq P \leq 1,500$ and more preferably $50 \leq P \leq 1,200$; an area fraction of the bottom faces of $0.001 \leq S \leq 0.6$, where S is defined as an average value of the area fractions ($cm^2/cm^2$) of the bottom faces on the same plane as the surface of the anode side of the membrane; and an area fraction of the top parts $T \leq 0.05$, where T is defined as an average value of the area fractions ($cm^2/cm^2$) of the top parts. It has not been anticipated that the projecting parts of such a shape on the surface of the anode side of the membrane remarkably increase the supply of an aqueous solution of an alkali chloride onto the surface of the anode side of the membrane during electrolysis without damaging the mechanical strength or electrochemical properties of the membrane, and significantly reduce impurities in an alkali hydroxide produced by electrolysis.

The projecting parts on the surface of the anode side of the membrane preferably has a value of b/a of $0.5 \leq b/a \leq 0.9$, where a is defined as an average value of lengths (μm) of the bottom sides on the same plane as the surface of the anode side of the membrane, and b is defined as an average value of widths (μm) of the projecting parts at the half heights h/2 (μm) of the projecting parts. If the value of b/a is 0.5 or more, the projecting part has a sufficient height within a preferred range of distribution density P of the projecting part necessary in the present invention, can sufficiently supply the aqueous solution of the alkali chloride onto the surface of the anode side of the membrane, does not decrease the strength of the projecting part, and can easily keep the shape of the projecting part even when the membrane is pressed against the anode of an electrolysis cell. If the value of b/a is 0.9 or less, the area of the projecting part contacting the anode of the electrolysis cell does not become excessive, and an adequate amount of the aqueous solution of the alkali chloride in an anode chamber of the electrolysis cell is supplied to the surface of the anode side of the membrane. Furthermore, the projecting part hardly decreases its strength.

The projecting parts in a more preferred embodiment satisfy $0.25 \leq h/a \leq 0.80$ in terms of a relation between an average height h (μm) of the projecting part on the surface of the anode side of the membrane and an average length a (μm) of the bottom side of the projecting part on the same plane as the surface of the anode side of the membrane. If the value of h/a is 0.25 or more, the projecting parts have sufficient height, the aqueous solution of the alkali chloride is sufficiently supplied, the area of the projecting part on the surface of the anode side of the membrane contacting the anode of the electrolysis cell does not become excessive, the fine foams can be inhibited from forming in the membrane, and the electrolysis performance can be inhibited from lowering. On the other hand, if the value of h/a is 0.8 or less, the projecting part does not decrease the strength, which stabilizes the electrolysis performance.

The projecting part including a polymer having an ion-exchange group is preferably discontinuous on the surface of the anode side of the membrane according to the present invention. The projecting part having the shape can make the aqueous solution of the alkali chloride sufficiently be supplied during electrolysis. Here, "being discontinuous" means that the projecting parts do not form an enclosed space on the surface of the anode side by connecting with each other to form a continuous wall in a narrow range of the membrane surface. The projecting part on the surface of the anode side of the membrane has preferably a shape of a circular cone, a multi-angular pyramid such as a triangular pyramid and a quadrangular pyramid, a hemisphere, a dome, a circular truncated cone, or a truncated multi-angular pyramid, and more preferably has a circular cone-like shape, a circular truncated cone-like shape, a quadrangular pyramid-like shape, a truncated quadrangular pyramid-like shape or the like, because the shape is superior in a contacting area between the projecting part and the anode of the electrolysis cell, and the balance of the strength of the projecting part. The projecting parts of the surface of the anode side of the membrane may have a single shape or a mixed shape of two or more shapes selected from these shapes.

Here, an average value a (μm) of lengths of the bottom sides on the same plane as the surface of the anode side of the membrane was obtained by cutting the cross section of the membrane passing the top of the projecting part into a thin film, and observing it with the magnification of 40 times by using an optical microscope. Specifically, when the projecting part has a shape of a circular cone, a circular truncated cone, a hemisphere or a dome, the bottom face of the projecting part was considered to be a circle, and the diameter was observed. On the other hand, when the projecting part has a shape of a quadrangular pyramid or a truncated quadrangular pyramid, the shape of the bottom face was considered to be a square and the length of a side was observed. The length of a side of the projecting part was determined. The average value was determined by observing 10 sides in each case.

Subsequently, the average value of heights h (μm) of the projecting parts and a half height h/2 (μm) of the projecting part were determined by cutting the cross section of the membrane passing the top of the projecting part into a thin film, and observing it with the magnification of 40 times by using an optical microscope. The average value was determined from the result of having observed 10 pieces of the cross sections. A width b (μm) of the projecting part at the half height h/2 of the projecting part was determined by measuring the diameter when the projecting part has a shape of a circular cone or a truncated circular cone, and by measuring the length of a side when the projecting part has a shape of a quadrangular pyramid or a truncated quadrangular pyramid. The average value was obtained similarly by observing 10 pieces.

Furthermore, the average value of area fractions S ($cm^2/cm^2$) of the bottom faces of the projecting parts on the same plane as the surface of the anode side of the membrane was determined by using the value of a and by approximating the area of the bottom face into the area of a circle or the area of a polygonal shape. An average value T ($cm^2/cm^2$) of an area fraction of the top part of the projecting part was approximately determined by cutting the cross section of the membrane into a thin film; observing the projecting part with the magnification of 100 times by using an optical microscope; measuring an average value of widths of the part 5 µm lower from the top of the projecting part toward the bottom face; and supposing the area of the cut shape as the area of a circle when the projecting part has a shape of the circular cone or the truncated circular cone and supposing the area of the cut shape as the area of the polygonal shape when the projecting part has a shape of the pyramid or the truncated pyramid. In addition, the values of S and T were respectively determined as the percentages of the areas of the bottom faces and the top parts to the unit area of the surface of the anode side of the membrane. The distribution density P (piece/cm$^2$) of the projecting parts was determined by observing the surface of the anode side of the membrane with the magnification of 40 times by using an optical microscope.

A porous substrate used in the present invention is used for imparting strength and dimensional stability to a membrane, and it is indispensably required that the most of the porous substrate exists in the membrane. Such a porous substrate is required to have heat resistance and chemical resistance over a long period of time, and accordingly is preferably formed of fibers made from a fluorinated polymer. The examples of the fluorinated polymer include polytetrafluoroethylene (PTFE), tetrafluoroethylene-perfluoroalkyl vinyl ether copolymer (PFA), tetrafluoroethylene-ethylene copolymer (ETFE), tetrafluoroethylene-hexafluoro propylene copolymer, trifluorochloroethylene-ethylene copolymer and vinylidene fluoride polymer (PVDF). However, it is preferable to use a fiber made from polytetrafluoroethylene in particular.

A porous substrate to be used in the present invention is formed of fibers having a diameter preferably of 20 to 300 denier, and more preferably of 50 to 250 denier; and is woven at a weave density preferably of 5-50 lines/inch. The porous substrate to be used has a shape of a fabric cloth, a nonwoven cloth or a knitted cloth, but preferably has the shape of the fabric cloth. The fabric cloth has a thickness preferably of 30 to 250 µm, and more preferably of 30 to 150 µm.

The fabric cloth or a knitted cloth of the porous substrate employs a monofilament, a multifilament, or a yarn thereof, a slit yarn or the like, and is woven with various types of weaving methods such as a plane fabric, a leno weave, a knit weave, a cord weave, and a seersucker.

The fabric cloth or the knitted cloth has an opening rate preferably of 30% or more, and more preferably of 50% or more and 90% or less. The opening rate is preferably 30% or more from the viewpoint of electrochemical properties as an ion-exchange membrane, and is preferably 90% or less from the viewpoint of a mechanical strength of the membrane.

A particularly preferable form among these various forms of porous substrates includes, for instance, a form which employs a tape yarn prepared by slitting a high-strength porous sheet made from PTFE into a shape of a tape, or a highly oriented monofilament of 50 to 300 denier made from PTFE, has a plain-weave structure with a weave density of 10 to 50 lines/inch, and further has a thickness in a range of 50 to 100 µm and an opening rate of 50% or more. Furthermore, the fabric cloth may include a supporting fiber which is usually referred to as a sacrificial core material, for the purpose of preventing a deviation of a texture of the porous substrate in a process of producing the membrane. The supporting fiber has solubility in the process of producing the membrane or under an electrolysis environment. A material to be used for the supporting fiber includes rayon, polyethylene terephthalate (PET), cellulose and polyamide. The amount of the blended fabric of the supporting fiber in this case is preferably 10 to 80 wt %, and more preferably is 30 to 70 wt % with respect to the whole fabric cloth or the whole knitted cloth.

A fluorine-containing polymer used in the present invention is a polymer formed of a main chain of fluorinated hydrocarbon, has a functional group as a pendant side chain, which is transformable to an ion-exchange group by hydrolysis and the like, and can be melt-processed.

In the next place, an example of a general production method of such a fluorine-containing polymer will be described.

A fluorine-containing polymer can be produced by copolymerizing at least one monomer selected from the following first group with at least one monomer selected from the following second group and/or third group.

The monomer of the first group is a vinyl fluoride compound, for instance, at least one compound that is selected from vinyl fluoride, hexafluoropropylene, vinylidene fluoride, trifluoroethylene, chlorotrifluoroethylene, perfluoro (alkyl vinyl ether) and tetrafluoroethylene, and when the polymer is used particularly as a membrane for alkaline electrolysis, is preferably selected from tetrafluoroethylene, perfluoro(alkyl vinyl ether) and hexafluoropropylene, which are perfluoromonomers containing no hydrogen.

The monomer of the second group is a vinyl compound having a functional group which is transformable to a carboxylic acid type ion-exchange group. A monomer to be generally used is expressed by the formula of $CF_2=CF(OCF_2CYF)_s—O(CZF)_t—COOR$. Here, s is an integer of 0 to 2, t is an integer of 1 to 12, Y and Z represent F or $CF_3$, and R represents a lower alkyl group.

A preferable monomer is a compound expressed by $CF_2=CFO(CF_2CYFO)_n—(CF_2)_m—COOR$. Here, n is an integer of 0 to 2, m is an integer of 1 to 4, Y represents F or $CF_3$, R represents $CH_3$, $C_2H_5$ and $C_3H_7$.

When the polymer is used particularly as a membrane for alkaline electrolysis, the monomer is preferably a perfluoro compound, but only R (lower alkyl group) is not necessary to be a perfluoro type, because it disappears when the functional group is hydrolyzed into the ion-exchange group. Such a preferable monomer includes, for instance, $CF_2=CFOCF_2—CF(CF_3)—O—CF_2COOCH_3$, $CF_2=CFOCF_2CF(CF_2)O(CF_2)_2COOCH_3$, $CF_2=CF[OCF_2—CF(CF_3)]_2O(CF_2)_2COOCH_3$, $CF_2=CFOCF_2CF(CF_3)O(CF_3)_3COOCH_3$, $CF_2=CFO(CF_2)_2COOCH_3$ and $CF_2=CFO(CF_2)_3COOCH_3$.

The monomer of the third group is a vinyl compound having a functional group which is transformable to a sulfone type ion-exchange group. A preferable compound is expressed by the general formula of $CF_2=CFO—X—CF_2—SO_2F$, where X is a group selected from various types of perfluorocarbon groups. A specific example of the compound includes $CF_2=CFOCF_2CF_2SO_2F$, $CF_2=CFOCF_2CF(CF_3)OCF_2CF_2SO_2F$, $CF_2=CFOCF_2CF(CF_3)OCF_2CF_2CF_2SO_2F$, $CF_2=CF(CF_2)_2SO_2F$, $CF_2=CFO[CF_2CF(CF_3)O]_2CF_2CF_2SO_2F$, and $CF_2=CFOCF_2CF(CF_2OCF_3)OCF_2CF_2SO_2F$, and a particularly preferable example among these is $CF_2=CFOCF_2CF(CF_3)OCF_2CF_2CF_2SO_2F$ and $CF_2=CFOCF_2CF(CF_3)OCF_2CF_2SO_2F$.

A copolymer of these monomers can be produced with a polymerization method developed for single fluorinated ethylene and a copolymer thereof, and particularly with a general polymerization method used for tetrafluoroethylene. For instance, there is a non-aqueous method which includes: employing an inert liquid such as perfluoro hydrocarbon and chloro fluorocarbon as a solvent; using a radical-polymerization initiator such as a perfluorocarbon peroxide and an azo compound; and can copolymerize the monomer at a temperature of 0 to 200° C. and a pressure of 0.1 to 20 MPa.

A type and a ratio of the monomers to be used for copolymerization are selected and determined from among the above described three groups according to a type and amount of a desired functional group required for a fluorinated polymer.

For instance, when a polymer containing only a carboxylic ester functional group is required, it is acceptable to select at least one monomer respectively from the monomers of the first group and the second group, and copolymerize them.

On the other hand, when a polymer containing only a sulfonyl fluoride functional group is required, it is acceptable to select at least one monomer respectively from the monomers of the first group and the third group, and copolymerize them.

Furthermore, when a polymer containing both of two functional groups, carboxylic ester and sulfonyl fluoride, is required, it is acceptable to select at least one monomer respectively from the monomers of the first group, the second group and the third group, and copolymerize them.

In this case, an objective fluorinated polymer can be obtained by separately polymerizing a copolymer from monomers of the first group and the second group and a copolymer from monomers of the first group and the third group, and then mixing the copolymers. As for a mixing ratio of each monomer, when it is desired to increase an amount of the required functional group per unit monomer, it is acceptable to increase the ratio of the monomers selected from the second group or the third group.

An ion-exchange membrane according to the present invention having an ion-exchange capacity in a range preferably of 0.5 to 2.0 mg equivalent weight/g of dried resin, and more preferably of 0.6 to 1.5 mg equivalent weight/g of dried resin in general, after the whole amount of the functional groups have been converted to an exchange group is used.

A process for producing an ion-exchange membrane according to the present invention is characterized in that a projecting part including a polymer having an ion-exchange group is formed on the surface of an anode side by bringing an embossed release paper closely in contact with the surface of the anode side and transferring the embossed shape of the release paper to the surface, when a fluorine-containing polymer having an ion-exchange group is layered on a porous substrate.

Here, an objective shape is previously embossed on the release paper to be used when integrating the film with the porous substrate, in order to provide the projecting part on the surface of the membrane in the anode side, which is an object of the present invention. A method for forming the embossed shape on the release paper includes, for instance, the steps of: bringing the release paper closely in contact with the heated metallic roll having a surface to which an objective projecting shape is formed in advance; and pressing the release paper to the heated metallic roll by using a pressure roll made from a resin, at a forming temperature preferably of 20 to 120° C. and more preferably of 25 to 80° C., with a line pressure of preferably 500 N/cm or more and more preferably of 600 to 2,000 N/cm, and at a forming speed preferably of 50 m/minute or smaller, and more preferably of 40 m/minute or smaller. In addition, the depth of an embossed recess can be controlled by changing the line pressure of the pressure roll made from a resin for pressing the release paper to the heated metal roll. The basis weight of the release paper to be used may be selected from a comparatively wide range, but preferably is 50 to 400 g/m² from the viewpoint of handling resistance and heat resistance.

In addition, when transferring the embossed shape to the membrane, it is preferable for keeping the mechanical strength of the membrane to employ a method of bringing the release paper closely contact with the surface of the membrane in an anode side by reducing the pressure through the release paper.

Furthermore, it is preferable for surely transferring a previously embossed shape formed on the release paper to the surface of the membrane in the anode side to control the temperature of the surface of the membrane preferably at 180° C. or higher and 300° C. or lower.

In addition, when embossing the release paper, it is preferable to employ the release paper having the air permeability of 0.03 MPa or less, and preferably of 0.025 MPa or less and emboss the release paper under a reduced pressure, in order to further improve the adhesiveness of the release paper to the membrane and surely transfer a previously embossed shape formed on the release paper.

The air permeability of the release paper was measured with a pneumatic micrometer type testing instrument according to a standard of JAPAN TAPPI No. 5—1:2000.

The release paper can have any embossed shape thereon because the metallic roll transfers an embossing shape formed thereon to the surface of the release paper.

In order to achieve the purpose of the present invention, various shapes can be selected from the shapes of a circular cone, a multi-angular pyramid such as a triangular pyramid and a quadrangular pyramid, a hemisphere, a dome, a circular truncated cone and a truncated pyramid, and mixed shapes of two or more of the above shapes may be selected.

In addition, the average height of the embossed shape is preferably 20 to 150 µm, and more preferably is 20 to 120 µm, as described above, because when the ion-exchange membrane is integrated, approximately the same shape as the embossed shape is transferred to the surface of the anode side of the membrane. Furthermore, a distribution density of embossment is preferably 20 to 1,500 pieces/cm², and more preferably is 50 to 1,200 pieces/cm². An average value of an area fraction of bottom faces of the embossed shape is preferably 0.001 to 0.6 cm²/cm². An area fraction of the top part of the embossed shape differs depending on the embossed shape, but is preferably 0.05 cm²/cm² or less in any case.

The embossed shape preferably has such a relationship between a and b as to satisfy the expression of $0.5 \leq b/a \leq 0.9$, where a is defined as an average value of lengths of the bottom sides of the bottom faces in the embossed shape, and b is defined as an average value of widths at the half height of the embossed shape; and preferably has such a relationship between a and h as to satisfy the expression of $0.25 \leq h/a \leq 0.8$, where a is defined as the average value of the lengths of the bottom sides of the bottom faces in the embossed shape, and h is defined as an average value of heights of the embossed shape.

When the membrane described above is produced by using the release paper, the membrane acquires projecting parts comprising a polymer having an ion-exchange group formed on the surface in an anode side, the projecting parts mitigate the adhesiveness of the membrane to an anode while electrolysis, and an alkali chloride solution in the anode side is sufficiently supplied to the surface of the anode side of the membrane. Thus, the object of the present invention can be achieved.

The embossed recess formed in the release paper is preferably discontinuous. If the embossed recesses form a closed shape such as grid, the part surrounded by the projecting part is formed, when the embossed shape is transferred to the surface of the anode side of the membrane. The surrounded part makes it difficult for the alkali chloride solution to be sufficiently supplied to the anode side during electrolysis.

The recesses embossed in the release paper may be regularly arrayed or arranged at random, as long as the arrangement does not exceed the range of the distribution density and the depth of the embossed recess according to the present invention.

A particularly preferred method includes forming a film by coextruding a fluorine-containing polymer (first layer) which contains a carboxylic ester functional group and is located in a cathode side and a fluorine-containing polymer (second layer) which contains a sulfonyl fluoride functional group. Aside from the above prepared film, a fluorine-containing polymer (third layer) which contains a sulfonyl fluoride functional group is singly formed into a film beforehand. Those prepared films are integrated by the steps of: stacking the third layer film, a porous substrate and a composite film of the second layer with the first layer in this order on a flat plate or a drum which is provided with a heat source and a vacuum source and has many pores on the surface, through a heat-resistant release paper having gas permeability; and integrating them at a temperature at which each polymer melts while removing air among the layers by reducing pressure. Here, coextruding the first layer and the second layer contributes to the enhancement of the adhesive strength between the interfaces, and integration of the layers under the reduced pressure has a feature of making the thickness of the third layer on the porous substrate larger, in comparison with a pressurization process. Furthermore, sufficient mechanical strength of the membrane can be retained, because the porous substrate is fixed in the inner face of the membrane.

In the above description, for the purpose of enhancing the electrical performance of the ion-exchange membrane, a fourth layer containing both functional groups of carboxylate ester and sulfonyl fluoride can be interposed between the first layer and the second layer, or the second layer itself can be replaced with the layer containing both of the functional groups of the carboxylic ester and the sulfonyl fluoride. In this case, a process may be employed which separately produces a polymer containing the sulfonyl fluoride functional group, and a polymer containing the carboxylic ester functional group, and then mixing the polymers, or a process may be also employed which copolymerizes both of a monomer containing the carboxylic ester functional group and a monomer containing the sulfonyl fluoride functional group. When inserting the forth layer as a structure of the membrane, it is an acceptable process to form a co-extruded film of the first layer and the fourth layer, singly form the third layer and the second layer into films separately, and stack them with the above described method, or to form a film by coextruding three layers of the first layer, the fourth layer and the second layer at one time.

Here, the first layer has a thickness preferably of 5 to 50 μm and more preferably of 5 to 30 μm. The second layer has a thickness preferably of 30 to 120 μm and more preferably of 40 to 100 μm, because of being a layer of dominating the strength of the membrane. The third layer has a thickness preferably of 15 to 50μ. Furthermore, when interposing the above described fourth layer between the first layer and the second layer, the total thickness of the ion-exchange membrane prior to hydrolysis is appropriately controlled to preferably 200 μm or less and more preferably in a range of 50 to 180 μm. The thickness of the membrane is particularly preferably 50 μm or more from the viewpoint of mechanical strength, and is 180 μm or less from the viewpoint of electrolytic resistance.

As mentioned before, the cation-exchange membrane for electrolysis is required to cause a low voltage. As one method for lowering the voltage, a method is employed which decreases the thickness of a layer made from a fluororesin containing a carboxylic acid group, and the layer made from a fluororesin containing a sulfonic acid group. In this case, as for the strength of the membrane, there is a problem that the strength of the membrane decreases proportionally to the thickness of the membrane. In order to prevent the decrease of the strength of the membrane, a method is adopted which embeds a porous substrate made from PTFE or the like in the membrane, but the ion-exchange membrane containing the porous substrate makes a resin layer around the porous substrate the thinnest part which strongly affects the strength of the membrane.

Accordingly, in order not to decrease the strength of the ion-exchange membrane, such a production method is effective as not to decrease the thickness of the resin layer around the porous substrate.

A method of transferring an embossed shape previously formed on a release paper to the surface of the membrane according to the present specification can provide discontinuous projecting parts made from a fluorinated resin on the surface of the anode side of the ion-exchange membrane without thinning the resin layer around the porous substrate, and can improve the surface of the anode side of the membrane in a shape without lowering the strength of the membrane. In addition, a production method according to the present invention does not make a melted fluorine-containing polymer directly contact a roll, and accordingly can prevent the metallic roll from being corroded even when forming the projecting parts, for instance, by using the metallic roll. Furthermore, the production method according to the present invention provides small and discontinuous projecting parts on the surface of the anode side of the membrane, consequently reduces a contact portion between the anode in an electrolytic tank and the surface of the membrane, makes an alkali chloride solution sufficiently be supplied, and accordingly can largely reduce impurities in an alkali hydroxide to be produced.

A membrane according to the present invention may have an inorganic coating layer for preventing the gases from being entrapped on the surfaces of the cathode side and the anode side, as needed. The coating layer can be formed on the membrane, for instance, by spraying a liquid having fine inorganic oxide particles dispersed in a polymer binder solution.

The fluorine-containing cation-exchange membrane according to the present invention can be used for various types of electrolysis, but the case of being used for the electrolysis of an aqueous alkali chloride solution will now be described here, as a representative example. A known condition can be adopted as an electrolysis condition. For instance, the electrolysis is conducted on the conditions of an electrolysis temperature of 50 to 120° C. and a current density of 5 to 100 A/dm$^2$, while supplying a 2.5 to 5.5 normal (N) aqueous solution of an alkali chloride into an anode chamber, and supplying water or a diluted aqueous solution of an alkali hydroxide into a cathode chamber.

An electrolysis cell, in which a fluorine-containing cation-exchange membrane for electrolysis according to the present invention is used, may be a single-electrode type or a double-electrode type as long as the tank has the above described structure including a cathode and an anode. The electrolysis cell is formed preferably, for instance, from titanium as a material having resistance to an alkali chloride and chlorine in an anode chamber, and from nickel as a material having resistance to an alkali hydroxide and hydrogen in a cathode chamber. As for the arrangement of electrodes, the fluorine-containing cation-exchange membrane for electrolysis according to the present invention and the anode may be arranged at a suitable space, but in the case of the membrane according to the present invention, the purpose can be achieved without any problem even if the anode and the ion-exchange membrane are arranged so as to contact each other. In addition, the cathode is generally arranged adjacent to the ion-exchange membrane at a suitable space, but an advantage offered by the present invention is not lost even in a contact type electrolysis cell having no such space (zero-gap-type electrolysis cell).

In the next place, the present invention will now be described with reference to examples and comparative examples.

EXAMPLES

The present invention will now be described below with reference to the examples and the comparative examples, but the present invention is not limited to these examples at all.

In the examples and comparative examples, the electrolysis was conducted in a self-circulation type electrolysis cell with an area of 1 $dm^2$ having a cathode of an expanded metal and an anode of a porous plate (having pores of 4 mmΦ arranged at 6 pitches, open area rate of 40%), at a temperature of 90° C. with a current density of 60 A/$dm^2$ for seven days, while supplying an aqueous solution of sodium chloride controlled to the concentration of 205 g/liter to an anode side, keeping the concentration of caustic soda of a cathode side at 32% by weight, and setting a differential pressure between a fluid pressure in the cathode side of the electrolysis cell and a fluid pressure in the anode side so that the fluid pressure of the cathode side can be higher by 8.8 kPa.

Example 1

A fabric cloth with a thickness of 100 μm was obtained as a porous substrate by the steps of: preparing a thread by twisting a tape yarn of 100 deniers made from polytetrafluoroethylene (PTFE) at 900 times/m; preparing a supporting fiber (sacrificial thread) by twisting 6 filaments of polyethylene terephthalate (PET) of 30 deniers at 200 times/m as a warp; preparing a weft by twisting 8 filaments of a PET thread of 35 deniers at 10 times/m; and plain-weaving these threads while alternately disposing the PTFE threads at 24 threads per inch and the sacrificial threads at 64 threads per inch which is 4 times higher density than that of the PTFE threads. The obtained fabric cloth was controlled into the thickness of 70 μm by being crimped by a heated metallic roll. At this time, the open area ratio of only the PTFE thread was 75%.

Next, a polymer (A) was prepared which was a copolymer of $CF_2=CF_2$ and $CF_2=CFOCF_2CF(CF_3)OCF_2CF_2COOCH_3$, and had an ion-exchange capacity of 0.85 mg equivalent/g dry resin; a polymer (B) was prepared which was a copolymer of $CF_2=CF_2$ and $CF_2=CFOCF_2CF(CF_3)OCF_2CF_2SO_2F$, and had an ion-exchange capacity of 0.95 mg equivalent/g dry resin; and a polymer (C) was prepared which had the same structure as the polymer (B) and had an ion-exchange capacity of 1.05 mg equivalent/g dry resin. A dual-layer film (x) was prepared by coextruding the above polymers with a T-die technique. The film was formed of the polymer (A) with the thickness of 25 μm and the polymer (B) with the thickness of 75 μm. In addition, a film (y) with the thickness of 25 μm formed of a polymer (C) was obtained with a single-layer T-die technique.

Next, a metallic roll having protrusions (projecting parts) on the surface was prepared, which had a circular truncated cone shape, a average height of 150 μm, a distribution density of about 500 pieces/$cm^2$, an area fraction of the bottom faces of 0.157 $cm^2/cm^2$, a length of the bottom sides of 200 μm, and a width of 125 μm at the half height of the protruding part, and was heated to 40° C.; and an embossed shape was formed on a release paper with a basis weight of 127 g/$m^2$ by crimping the release paper with the heated metallic roll and a resinous pressure roll at a line pressure of 1,000 N/cm for the resinous pressure roll at a embossing speed of 10 m/min.

The air permeability of the release paper used herein before being embossed was 0.005 MPa when measured with a pneumatic micrometer type tester according to a technical standard of JAPAN TAPPI N0.5—1:2000.

A composite membrane was obtained by the steps of: stacking the release paper, the film (y), the porous substrate and the film (x) of various materials obtained here in this order, on a drum having a heat source and a vacuum source in the inner part, and having fine pores on its surface; crimping the stacked films while heating and depressurizing them; and then removing the release paper. At this time, a forming temperature was 225° C. and a reduced pressure was 0.022 MPa.

The surface of the obtained membrane was observed, and as a result, it was confirmed that a film (y) of an anode side had projecting parts with a truncated-cone-like shape formed thereon, which have the height of about 45 μm by an average value h, are distributed at a density P of 500 pieces/$cm^2$, have such bottom faces as to occupy about 0.04 $cm^2/cm^2$ by an average value S of area fraction, have such top parts as to occupy about 0.012 $cm^2/cm^2$ by an average value T of area fraction, have bottom sides with the length of about 100 μm by an average value a, have a width of about 75 μm by an average value b at the half height of the projecting part, and are made from a polymer having an ion-exchange group. At this time, a value of b/a was 0.75 and a value of h/a was 0.45.

Next, the obtained composite membrane was hydrolyzed at 90° C. for one hour, and then was rinsed and dried. Furthermore, a suspension was prepared by adding and dispersing 20% by weight of zirconium oxide particles with a primary particle diameter of 0.02 μm into an ethanol solution containing 5% by weight of an acid type polymer of a polymer (C), and a gas-releasing coating film of 0.5 mg/$cm^2$ was formed on both surfaces of the above described composite membrane by spraying the suspension with a spraying technique.

Tensile strength, tensile elongation and electrolysis performance were evaluated on the fluorine-containing cation-exchange membrane obtained as described above. The tensile strength and the tensile elongation were measured according to JIS K6732 by the steps of: preparing a sample which was taken out from the membrane in a direction of 45 degrees with respect to a porous substrate embedded in the membrane and had a width of 1 cm; and stretching the sample on conditions of a distance between chucks of 50 mm and a tensile speed of 100 mm/min. The electrolysis was performed in the above described electrolysis cell in which a film (y) was arranged so as to face an anode at a current density of 60 A/$dm^2$ and a temperature set at 90° C. for seven days. Electrolysis voltage, current efficiency and an amount of sodium chloride in produced caustic soda were measured, and electrolysis stability was evaluated from respective values measured on the second day and the seventh day after electrolysis has been started. The amount of sodium chloride in the produced caustic soda (NaCl/50%-NaOH) was determined by: obtaining a value measured by the steps of reacting chloride ions of sodium chloride in the caustic soda with mercury thiocyanate to isolate thiocyanate ions, reacting the thiocyanate ions with iron (III) ions to form thiocyanate iron (III), and measuring the intensity of coloration due to the thiocyanate iron (III); and converting the value to the case in which a caustic soda solution concentration was 50% by weight.

The results are shown in Table 1 together with the results of other examples and comparative examples. The membrane showed the values of tensile strength and tensile elongation sufficiently tolerable for the electrolysis. The membrane also showed a small degradation of electrolysis performance on the second day after the initiation of electrolysis and the seventh day, an ultratrace amount of sodium chloride contained in caustic soda, no remarkable increase even on the seventh day after the initiation of electrolysis, and consequently stable electrolysis performance.

Example 2

A release paper was embossed by a resinous pressure roll at a line pressure of 800 N/cm. A composite membrane was prepared with the same method as Example 1 so that the projecting parts made from a polymer having an ion-exchange group formed on the surface of an anode side could show the height of about 33 μm by an average value h, be distributed at a density P of 500 pieces/cm$^2$, have such bottom faces as to occupy about 0.025 cm$^2$/cm$^2$ by an average value S of area fraction, have such top parts as to occupy about 0.012 cm$^2$/cm$^2$ by an average value T of area fraction, have bottom sides with the length of about 80 μm by an average value a, and have a width of about 67 μm by an average value b at the half height of the projecting part. At this time, a value of b/a was about 0.84 and a value of h/a was about 0.41. The obtained composite membrane was subjected to electrolysis on the same conditions as in Example 1. The results are shown in Table 1 in the same way. The Example 2 showed adequate results similar to the case of Example 1.

Example 3

A metallic roll having protrusions (projecting parts) on the surface was prepared, which had a quadrangular pyramid shape, an average height of 150 μm, a distribution density of about 250 pieces/cm$^2$, an area fraction of the bottom faces of 0.4 cm$^2$/cm$^2$, a length of the bottom sides of 400 μm, and a width of 225 μm at the half height of the protruding part, and was heated to 40° C.; and an embossed shape was formed on a release paper with a basis weight of 127 g/m$^2$ by crimping the release paper with the heated metallic roll and a resinous pressure roll at a line pressure of 1,100 N/cm for the resinous pressure roll at a embossing speed of 10 m/min. A composite membrane was made by using the release paper with the same method as in Example 1.

It was confirmed that the obtained composite membrane made from a polymer having an ion-exchange group had the projecting parts formed on the surface of an anode side, which had the height of about 66 μm by an average value h, were distributed at a density P of 250 pieces/cm$^2$, had such bottom faces as to occupy about 0.1 cm$^2$/cm$^2$ by an average value S of area fraction, had such top parts as to occupy about 0.009 cm$^2$/cm$^2$ by an average value T of area fraction, had bottom sides with the length of about 200 μm by an average value a, and had a width of about 125 μm by an average value b at the half height of the projecting part. At this time, the value of b/a was about 0.63 and the value of h/a was about 0.33. The obtained composite membrane was subjected to electrolysis on the same conditions as in Example 1. The results are shown in Table 1 in the same way. The Example 3 showed adequate results similar to the case of Example 1.

Example 4

A release paper was embossed at a line pressure of 1400 N/cm for a resinous pressure roll. A composite membrane was prepared with the same method as Example 3 so that the projecting parts made from only a polymer having an ion-exchange group formed on the surface of an anode side showed the height of about 95 μm by an average value h, were distributed at a density P of 250 pieces/cm$^2$, had such bottom faces as to occupy about 0.18 cm$^2$/cm$^2$ by an average value S of area fraction, had such top parts as to occupy about 0.009 cm$^2$/cm$^2$ by an average value T of area fraction, had bottom sides with the length of about 270 μm by an average value a, and had a width of about 135 μm by an average value b at the half height of the projecting part. At this time, a value of b/a was about 0.50 and a value of h/a was about 0.35. The obtained composite membrane was subjected to electrolysis on the same conditions as in Example 1. The results are shown in Table 1 in the same way. The Example 4 showed adequate results similar to the case of Example 1.

Comparative Example 1

A composite membrane was prepared by using a release paper that had not been embossed with the same method as in Example 1 and evaluated. As a result of having observed the surface of an anode side, there was not such a projecting part as seen in Examples. The result is shown in Table 1. The Comparative Example 1 showed adequate mechanical strength which was confirmed in a tensile test, but showed a large degradation of current efficiency among electrolysis performances, and showed a large amount of sodium chloride in caustic soda even on the second day after initial electrolysis, and a remarkably increased amount of the sodium chloride on the seventh day.

Comparative Example 2

A release paper was embossed at a line pressure of 400 N/cm for a resinous pressure roll. A composite membrane was prepared with the same method as Example 3 so that the projecting parts made from a polymer having an ion-exchange group formed on the surface of an anode side showed the height of about 16 μm by an average value h, were distributed at a density P of 250 pieces/cm$^2$, had such bottom faces as to occupy about 0.019 cm$^2$/cm$^2$ by an average value S of area fraction, had such top parts as to occupy about 0.009 cm$^2$/cm$^2$ by an average value T of area fraction, had bottom sides with the length of about 87 μm by an average value a, and have a width of about 46 μm by an average value b at the half height of the projecting part. At this time, a value of b/a was about 0.53 and a value of h/a was about 0.18. The obtained composite membrane was subjected to electrolysis on the same conditions as in Example 1. Results are shown in Table 1 in the same way. Similarly to Comparative Example 1, Comparative Example 2 showed adequate mechanical strength, but showed a large degradation of current efficiency among electrolysis performances, and showed a large amount of sodium chloride in caustic soda even on the second day after initial electrolysis.

Comparative Example 3

A release paper was embossed at a line pressure of 400 N/cm for a resinous pressure roll. A composite membrane was prepared with the same method as Example 1 so that the projecting parts made from a polymer having an ion-exchange group formed on the surface of an anode side showed the height of about 15 μM by an average value h, were distributed at a density P of 500 pieces/cm², had such bottom faces as to occupy about 0.017 cm²/cm² by an average value S of area fraction, had such top parts as to occupy about 0.012 cm²/cm² by an average value T of area fraction, had bottom sides with the length of about 65 μm by an average value a, and have a width of about 35 μm by an average value b at the half height of the projecting part. At this time, a value of b/a was about 0.54 and a value of h/a was about 0.23. The obtained composite membrane was subjected to electrolysis on the same conditions as in Example 1. The result is shown in Table 1. The Comparative Example 3 also showed adequate mechanical strength, but showed a large degradation of current efficiency among electrolysis performances, and showed a large amount of sodium chloride in caustic soda even on the second day after initial electrolysis.

trochemical properties and mechanical strength in the electrolysis of an aqueous solution of an alkali chloride, provides an alkali hydroxide of high quality, can exhibit stable electrolysis performance over a long period of time, and can significantly contribute to a reduction of an electrolysis cost and provision of an alkali hydroxide of high purity.

The invention claimed is:
1. A cation-exchange membrane for electrolysis comprising a fluorine-containing polymer having an ion-exchange group and a porous substrate, characterized in that the membrane has projecting parts comprising a polymer having an ion-exchange group on the surface of an anode side of the membrane;
  $20 \leq h \leq 95$, where h is defined as an average value of heights (μm) from the surface of the anode side of the membrane to the tops of the projecting parts;
  $50 \leq P \leq 1{,}200$, where P is defined as a distribution density (piece/cm²) of the projecting parts;

TABLE 1

| | | unit | Example 1 | Example 2 | Example 3 | Example 4 | Comparative Example 1 | Comparative Example 2 | Comparative Example 3 |
|---|---|---|---|---|---|---|---|---|---|
| polymer (A) or layer made from polymer (A) | ion-exchanging capacity | mg equivalent/ g dry resin | 0.85 | 0.85 | 0.85 | 0.85 | 0.85 | 0.85 | 0.85 |
| | thickness | μm | 25 | 25 | 25 | 25 | 25 | 25 | 25 |
| polymer (B) or layer made from polymer (B) | ion-exchanging capacity | mg equivalent/ g dry resin | 0.95 | 0.95 | 0.95 | 0.95 | 0.95 | 0.95 | 0.95 |
| | thickness | μm | 75 | 75 | 75 | 75 | 75 | 75 | 75 |
| polymer (C) or layer made from polymer (C) | ion-exchanging capacity | mg equivalent/ g dry resin | 1.05 | 1.05 | 1.05 | 1.05 | 1.05 | 1.05 | 1.05 |
| | thickness | μm | 25 | 25 | 25 | 25 | 25 | 25 | 25 |
| average height (h) of projecting part on anode face side | | μm | 45 | 33 | 66 | 95 | — | 16 | 15 |
| distribution density (P) of projecting part on anode face side | | piece/cm² | 500 | 500 | 250 | 250 | — | 250 | 500 |
| average area fraction (S) of bottom faces of projecting part on anode face side | | cm²/1 cm² | 0.04 | 0.025 | 0.10 | 0.18 | — | 0.019 | 0.017 |
| average area fraction (T) of top part of projecting part on anode face side | | cm²/1 cm² | 0.012 | 0.012 | 0.009 | 0.009 | — | 0.009 | 0.012 |
| averages length (a) of bottom side of projecting part on anode face side | | μm | 100 | 80 | 200 | 270 | — | 87 | 65 |
| average width (b) at half height of projecting part on anode face side | | μm | 75 | 67 | 125 | 135 | — | 46 | 35 |
| b/a | | — | 0.75 | 0.84 | 0.63 | 0.50 | — | 0.53 | 0.54 |
| h/a | | — | 0.45 | 0.41 | 0.33 | 0.35 | — | 0.18 | 0.23 |
| shape of projecting part on anode face side | | — | circular truncated cone | circular truncated cone | quadrangular pyramid | quadrangular pyramid | — | quadrangular pyramid | circular truncated cone |
| tensile test | strength | kg/cm | 1.53 | 1.54 | 1.55 | 1.50 | 1.83 | 1.63 | 1.65 |
| | elongation | % | 55 | 53 | 55 | 50 | 65 | 58 | 58 |
| electrolysis voltage | second day | v | 3.53 | 3.55 | 3.49 | 3.55 | 3.56 | 3.55 | 3.55 |
| | seventh day | | 3.54 | 3.56 | 3.50 | 3.52 | 3.55 | 3.58 | 3.58 |
| current efficiency | second day | % | 96.3 | 96.7 | 96.5 | 96.5 | 95.5 | 96.1 | 96.0 |
| | seventh day | | 96.5 | 96.6 | 96.2 | 96.6 | 94.6 | 95.3 | 95.2 |
| amount of sodium chloride in caustic soda (NaCl/50%-NaOH) | second day | ppm | 15 | 20 | 18 | 12 | 75 | 65 | 58 |
| | seventh day | | 25 | 45 | 37 | 24 | 250 | 184 | 120 |

Industrial Applicability

A cation-exchange membrane for electrolysis according to the present invention can reduce impurities in an alkali hydroxide to be produced, while maintaining excellent elec- $0.001 \leq S \leq 0.6$, where S is defined as an average value of area fractions (cm²/cm²) of the bottom faces of the projecting parts on the same plane as the surface of the anode side of the membrane;

$T \leq 0.05$, where T is defined as an average value of area fractions (cm$^2$/cm$^2$) of the top parts of the projecting parts on the surface of the anode side of the membrane; and $$0.5 \leq b/a \leq 0.9 \text{ and}$$

$$0.25 \leq h/a \leq 0.80,$$

where a is defined as an average value of lengths (μm) of the bottom sides of the projecting parts on the same plane as the surface of the anode side of the membrane, and b is defined as an average value of widths (μm) of the projecting parts at the half height h/2 (μm) of the projecting part.

2. The cation-exchange membrane according to claim 1, wherein the projecting parts are discontinuous with each other.

3. The cation-exchange membrane according to claim 1 or 2, wherein the projecting parts have a single shape or a mixed shape of two or more shapes selected from the group consisting of a circular cone-like shape, a quadrangular pyramid-like shape, a circular truncated cone-like shape and a truncated quadrangular pyramid-like shape.

4. A process for producing an ion-exchange membrane for electrolysis according to claim 1 or 2, characterized by bringing an embossed release paper closely in contact with the surface of the anode side of the membrane and transferring the embossed shape of the release paper to the surface, when a fluorine-containing polymer having an ion-exchange group is layered on a porous substrate, thereby forming a projecting part comprising a polymer having an ion-exchange group on the surface of an anode side.

5. The process according to claim 4, wherein the release paper is closely brought in contact with the surface of the anode side of the membrane by reducing pressure through the release paper.

6. The process according to claim 4, wherein the embossed shape is one shape or a mixed shape of two or more shapes selected from the group consisting of a circular cone-like shape, a multi-angular pyramid-like shape, a hemisphere-like shape, a dome-like shape, a circular truncated cone-like shape and a truncated multi-angular pyramid-like shape.

7. An electrolysis apparatus comprising the cation-exchange membrane according to claim 1 or 2, a cathode and an anode, said apparatus being an electrolysis tank, wherein the surface having the projecting part of the cation-exchange membrane contacts or faces to the anode.

* * * * *